United States Patent [19]

Nakayama et al.

[11] Patent Number: 4,608,595
[45] Date of Patent: Aug. 26, 1986

[54] WHITE BALANCE CORRECTION FOR NEGATIVE-TO-POSITIVE CONVERSION

[75] Inventors: Yoshiaki Nakayama, Tokyo; Masafumi Inuiya, Kaisei, both of Japan

[73] Assignee: Fuji Photo Film Co., Ltd., Kanagawa, Japan

[21] Appl. No.: 600,819

[22] Filed: Apr. 16, 1984

[30] Foreign Application Priority Data

Apr. 19, 1983 [JP] Japan .................................. 58-67749

[51] Int. Cl.⁴ ............................................. H04N 9/73
[52] U.S. Cl. ...................................................... 358/29
[58] Field of Search ........................................ 358/29

[56] References Cited

U.S. PATENT DOCUMENTS 2,548,829  4/1951  Sziklai et al. ......................... 358/29
4,263,622  4/1981  Hinn .................................... 358/29

FOREIGN PATENT DOCUMENTS

1386604  3/1975  United Kingdom .................. 358/29

Primary Examiner—John W. Shepperd
Attorney, Agent, or Firm—Birch, Stewart, Kolasch & Birch

[57] ABSTRACT

A white balance correction circuit for negative-to-positive conversion of television signals includes an imaging device for picking up a negative picture to develop video signals which are respectively indicative of three separated colors. The three separated color signals are processed by three processing circuits which are assigned in one-to-one correspondence thereto. An encoder circuit combines output signals of the respective processing circuits to provide a color composite video signal representative of a positive picture associated with the negative picture. Each of the processing circuits comprises an inversion circuit for inverting one of the three separated video signals associated therewith, and a clamp circuit for maintaining extreme values of the video signal at a first predetermined value, whereby a positive picture having an adjusted luminance is reproduced.

2 Claims, 12 Drawing Figures

→ TIME

WHITE BALANCE CORRECTION FOR NEGATIVE-TO-POSITIVE CONVERSION

BACKGROUND OF THE INVENTION

1. Field of the Invention

The present invention relates to white balance correction and, more particularly, to a white balance correction circuit for use in a negative-to-positive conversion apparatus which shoots images recorded on a negative recording medium, and as a color negative film, to produce a television signal representative of positive images associated therewith.

2. Description of the Prior Art

Generally, color negative films are exposed in various lighting conditions, or light sources, and the color temperature of a light source is rarely corrected at the time of shooting. Correction of the color temperature is usually effected by a printer when a positive picture is reproduced from the negative picture on a sheet of sensitized paper.

When a picture recorded on a color negative is to be picked up by a television (TV) camera to be converted into a TV signal, simple negative-to-positive (NP) conversion process for merely inverting negative image into a positive image is insufficient because the color temperature has to be corrected as well.

To correct color temperatures under various condition, it is a primary requisite that correction be applied to at least two different groups of colors. Such a requisite has heretofore been implemented by, for example, an arrangement which allows one to correct color temperature by manipulating knobs assigned to a group of red and blue and a group of green and purple, while observing a picture displayed on a cathode ray tube (CRT) color monitor. However, adjusting the two different groups of colors while looking at the display requires expertness because it is difficult to adjust two factors on an orthogonal plane, that is, it is impossible to visually recognize the origin of each of red-blue and green-purple color vectors. While a vectorscope may be employed to attain accurate adjustment, adjustment relying on such a measuring instrument is unfeasible for use at home.

In a telecine system for broadcasting applications, it is a usual practice to use films which were exposed under standardized lighting and, therefore, the adjustment of white balance is relatively easy. However, the situation concerned with white balance adjustment is quite severe at odinary home; various negative films exposed under arbitrary or non-standardized lighting have to be picked up under other lighting conditions to be produced in the form of TV signals. In a strict sense, it is impractical to faithfully reconstruct or reproduce information representative of an original shooting field from negative information which has been partly lost. Nevertheless, in the broadcasting telecine system or the like, it has been performed by an expert skilled in TV camera adjustment to reproduce a picture on a monitor with its color balance and highlight and shadow portions corrected to an acceptably natural appearance, based only on a relationship between negative picture information and lighting for reproduction.

At home, however, such a high level of adjustment aided by experience cannot be expected for reproduction. Additionally, a mechanism associated with the device for the adjustment is incapable of performing accurate adjustment, while the use of a measuring instrument is impractical from the standpoint of cost-effective construction or the ease of handling.

Meanwhile, color negative films which are widespread today have wider latitudes so that pictures recorded thereon significantly differ from each other in the amount of exposure as well as in the deviation from adequate color balance. As well known, positive color prints are produced from such various color negative films at a special laboratory while optimumly correcting colors and the like. In TV playback system, however, it has become increasingly difficult to correct luminance and colors or at least to adjust white balance itself. The irregularity in the amount of exposure may be corrected to a noticeable extent by, for example, adjusting an iris in an imaging section of an NP conversion system. However, depending upon the object, a picture having a substantial luminance difference measured by the whole area photometry of a shooting field, for example, cannot be sufficiently corrected by iris adjustment alone.

SUMMARY OF THE INVENTION

It is therefore an object of the present invention to eliminate the drawbacks inherent in the prior art method and provide a white balance correction circuit for negative-to-positive conversion which is capable of reproducing a color image having white balance adequately adjusted without resorting to any troublesome manipulation.

In order to achieve this object, the present invention realizes in a practical configuration a method and procedure for white balance adjustment for a device adapted to pick up a picture on a color negative to display its corresponding positive picture, which method and procedure allows a minimum of adjustment loss to occur in an average sense and can be implemented with ease.

In accordance with the present invention, a white balance correction circuit for negative-to-positive conversion comprises an imaging device for picking up a negative picture to develop video signals which are respectively indicative of three separated colors, three processing circuits for respectively processing the three separated color signals, and an encoder circuit for combining output signals of the respective processing circuits to produse a color composite video signal for a positive picture, each of the processing circuits comprising an inversion circuit for inverting one of the three separated video signals associated therewith, and a clamp circuit for maintaining extreme values of the video signal at a first predetermined value, whereby a positive picutre having an adjusted luminance is reproduced.

In accordance with a preferred embodiment of the present invention, the processing circuit includes a variable gain amplifier circuit for amplifying an output signal of the inversion circuit, the variable gain amplifier circuit varying a gain thereof in response to an integrated average value of portions of the inverted and clamped signal which are higher than a second predetermined level, whereby a positive image having white balance corrected is reproduced.

The construction described above is derived basically from commonly applicable conditions for pictures to appear natural when color negatives produced under various shooting conditions are picked up and displayed on a TV monitor, as will be described hereinafter.

In the event of reproducing one frame of video signal on a TV display, at a specific stage whereat a video signal corresponding to one frame of picture has been separated into three separated color groups, the amplitude and DC level of an output signal are adjusted on a separated color video signal basis and, after the adjustment, signals representative of the three color groups are mixed to produce a composite video signal.

A video signal corresponding to one separated color may be controlled by any one of the following methods:

(i) For each of the three separated color signal processing systems, the signal is processed with the darkest level in the picture information (lightest part of a negative image signal) set at one which is shifted by a predetermined potential from the black level of a standard TV video signal toward the white side, whereafter the three separated color signals are mixed to develop a composite video signal;

(ii) For, each of the three separated color signal processing systems, the lightest part involved in the picture information (darkest part of a negative image signal) is determined to process the video signal so that the determined level may become a white level and, then, the three separated color signals are combined to develop a composite video signal;

(iii) Both methods (i) and (ii) are employed in combination to prepare a composite video signal; and (iv) In the event of the white level setting in the method (ii), signal portions higher than a predetermined slice level are integrated over one frame of video signal, then the video signal is amplified to cause the result to converge to a predetermined value, and then the three separated color signals are combined to produce a composite video signal.

By causing the levels of dark areas to coincide with a predetermined value signal by signal to develop a composite video signal as described above, the white balance of so-called shadow areas of pictures is corrected. By bringing the levels of light areas into coincidence, the white balance of so-called highlight portions is corrected. Further, employing both of such methods is successful to adjust the white balance of both shadow and highlight areas. Moreover, as will be described in detail hereinafter, when a control is performed such that integrated values of portions of a signal which are higher than a predetermined slice level have a predetermined value, the probability that good TV reproduction be attained from numerous kinds of unbalanced negatives which were provided by various shooting conditions will increase. The present invention has paid attention to such expectation and succeeded in experimentarily confirming it.

BRIEF DESCRIPTION OF THE DRAWINGS

The objects and features of the present invention will become more apparent from a consideration of the following detailed description taken in conjunction with the accompanying drawings in which.

DESCRIPTION OF THE PREFERRED EMBODIMENT

A white balance correction circuit for negative-to-positive conversion embodying the present invention will be described in detail with reference to the accompanying drawings.

Figure 1:
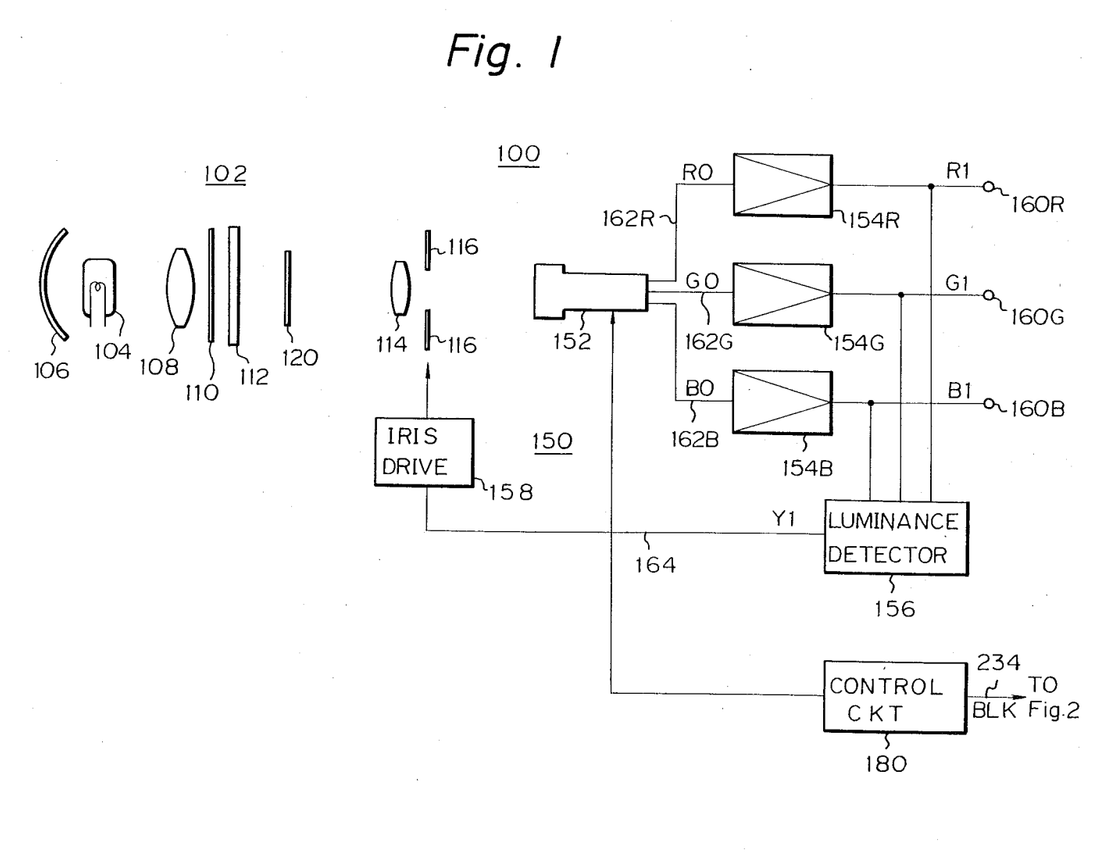
FIG. 1 is a schematic block diagram showing an image pickup section of a white balance correction circuit for negative-to-positive conversion embodying the present invention.

Referring to FIG. 1, a white balance correction circuit in accordance with a preferred embodiment of the present invention is shown, and includes an image pickup section 100 which is made up of an illuminating optical system, or optics, 102 and an image pickup circuit 150.

The optics 102 includes a light source 104, a mirror 106 for collecting and reflecting light, a condenser lens 108, a filter 110 for color temperature correction, a diffuser plate 112, an image pickup lens 114, and an iris 116. The image pickup section 150, on the other hand, includes a color imaging device 152, preamplifiers 154R, 154G and 154B, a luminance detection circuit 156, and an iris drive mechanism 158. A color negative film 120 undergone exposure and development is positioned at the rear of the diffuser plate 112. The color negative film 120 stores therein a negative image of a desired object and the present invention of course contemplates to convert such a negative image into a TV signal representative of its positive image.

The condenser lens 108 is calibrated such that light issuing from the light source 104 becomes effectively incident on the aperture of the lens 114. The filter 110 for color temperature correction is an optical filter adapted to substantially equalize, or well balance, video signal outputs 160R, 160G and 160B of the image pickup section 150. The filter 110 compensates the characteristics of the light source 104 so that wavelengths in the infrared range to which the imaging device 152 is sensitive may be removed as well as color components of an orange mask usually provided on the negative film 120. The diffuser plate 112 serves to scatter the light emanating from the light source 104 in order to free a reproduced picture from the influence of irregularity or scratches on the surface of the film 120.

The color imaging device 152 may comprise, for example, an ordinary image tube or a solid state imaging device. In the illustrative embodiment, signals R0, G0 and B0 representative of three separated colors, red (R), green (G) and blue (B), respectively appear at outputs 162R, 162G and 162B of the imaging device 152. It should be noted, however, that the combination of colors mentioned is only illustrative and may be replaced by a combination of any other separated colors such as Y (luminance), R and B or W (white), Ye (yellow) and Cy (cyan). Imaging device 152 is under the control of a control circuit 180 for producing video signals in a raster-scanning fashion.

The signals R0, G0 and B0 at the outputs 162R, 162G and 162B are amplified respectively by the preamplifiers 154R, 154G and 154B and, then, routed to the outputs 160R, 160G and 160B. The luminance detection circuit 156 processes color separated signals R1, G1 and B1 appearing at the outputs 160R, 160G and 160B so as to produce a rough luminance signal Y1 on an output 164. The luminance signal Y1 is used to control the iris drive mechanism 158 such that the opening of the iris 116 is so adjusted as to confine the quantity of incident light within the dynamic range of the imaging device 152. In this respect, for the luminance signal a relatively rough equation such as Y1=R1+2G1+B1 may be used.

The iris 116 regulates the quantity of light incident on the imaging device 152 in accordance with the luminance signal Y1. In this manner, the opening of the iris 116 is controlled in association with a denisty of the picture recorded on the film 120. This allows an adequate quantity of light to reach the imaging device 152 so that the video signals appearing at the outputs 160R, 160G and 160B are free from distortion and improved in signal-to-noise (S/N) ratio. Preferably, an arrangement is made such that the iris control described may be effected manually when desired.

Figure 2:
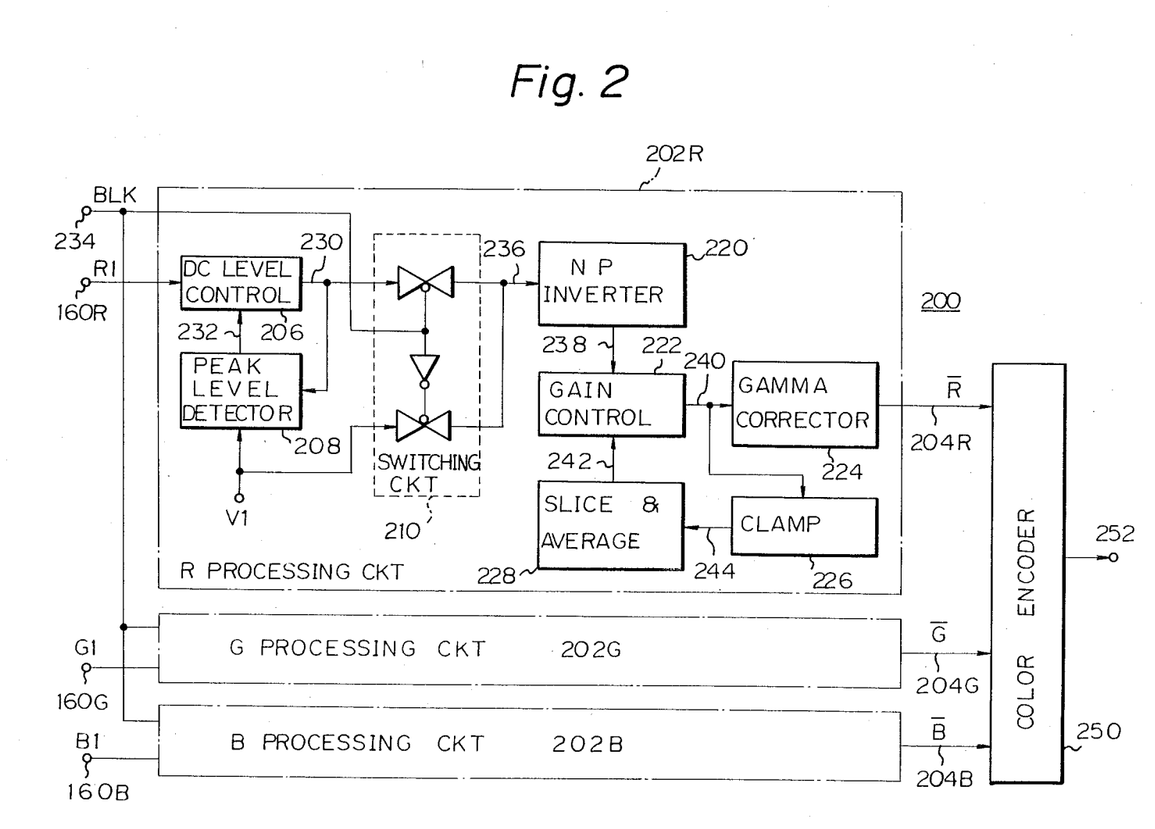
FIG. 2 is a schematic block diagram of a video signal processing section of the embodiment shown in FIG. 1.

Referring to FIG. 2, an essential portion of the negative-to-positive (NP) conversion apparatus is shown and generally designated by the reference numeral 200. As shown, the section 200 comprises three independent video signal processing circuits 202R, 202G and 202B assigned respectively to the three separated colors, and a color encoder 250 shared by the three video signal processing circuits. The processing circuits 202R, 202G and 202B are supplied respectively with the color separated signals R1, G1 and B1 from the preamplifiers 154R, 154G and 154B. The outputs 204R, 204G and 204B of the processing circuits 202R, 202G and 202B are commonly connected to the color encoder 250.

Each of the processing circuits 202R, 202G and 202B is constructed to invert the input signal 160R, 160G or 160B, i.e., video signal R1, G1 or B1 indicative of the negative image developed in the film 120, thereby adjusting the white balance. The inverted video signal $\overline{R}$ $\overline{G}$ or $\overline{B}$ is applied to the color encoder 250. All the processing circuits 202R, 202G and 202B may have a common construction and, therefore, the following description will focus to the circuit 202R by way of example.

The color encoder 250 develops a color television signal prescribed the NTSC or like standard from the inverted video signals, i.e., picture signals $\overline{R}$, $\overline{G}$ and $\overline{B}$ indicative of a positive image which is the inverted version of the negative image stored in the film 120. The standard color television signal from the color encoder 250 is applied to an output 252. In this construction, a positive image having an adequately adjusted white balance is attainable on a color TV display, not shown, by reproducing the picture signal appearing at the output 252.

The processing circuit, 202R for example, includes a DC level control circuit 206 connected to the input 160R, a peak level detector circuit 208, a switching circuit 210, a negative-to-positive (NP) inversion circuit 220, a gain control circuit 222, a gamma ($\gamma$) corrector circuit 224, a clamp circuit 226, and a slice and average circuit 228. The output of the gamma corrector circuit 224 is applied to the color encoder 252 as an output 204R of the processing circuit 202R.

The DC level control 206 functions to shift the DC level of the input video signal R1 in response to a control input 232. The peak level detector 208, on the other hand, serves to detect a peak of a signal appearing at an output 230 of the DC level control 206 and supplies the DC level control 206 with a control signal 232 so that the peak may settle at a predetermined value. The peak level detector 208 is supplied with a reference DC level v1 which gives a clamp level. The peak level detector 208 is a circuit for detecting a maximum value in the positive or negative direction of a signal.

Figure 3A:
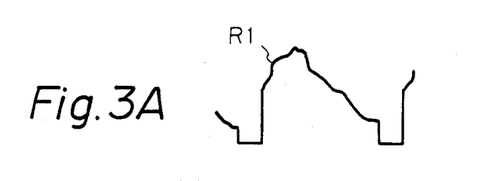
FIGS. 3A-3F show signal waveforms which appear in various portions of the circuitry shown in FIG. 2.
Figure 3B:
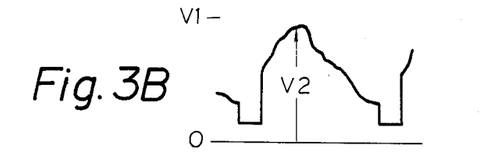

Concerning a maximum value in the positive direction, when such a video signal R1 as one shown in FIG. 3A (only the duration of one horizontal scanning 1H, is shown for simplicity) is applied to the peak level detector 208, it shifts the level of the video signal so that the peak may have a value V2, as shown in FIG. 3B. For example, assuming a video signal level having a reference of 0.7 volt, the difference between the voltages V1 and V2 should preferably be selected to be on the order of 0.05 volt. This, as will be understood later, effects luminance adjustment which controls the black level of a signal inverted by the NP inversion circuit 220 to predetermined one and, thereby, uniformalizes the white balance of mainly the shadow portions of a reproduced picture. On the other hand, if the peak detector 208 comprises a circuit for detecting the maximum value in the negative direction, the white balance of mainly the highlight portions of a reproduced image will be uniformalized.

Figure 3C:
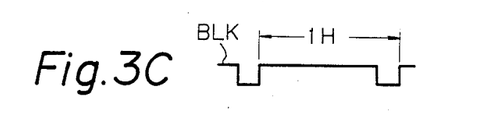

The switching circuit 210 is also supplied with the clamp level V1. A horizontal sync signal BLK indicative of a horizontal blanking period, FIG. 3C, is fed from control circuit 180, shown in FIG. 1, for the imaging device 152 to a terminal 234 and, therefrom, to the switching circuit 210. Then, the switching circuit 210 alternately switches the video signal at the input 230 and the clamp level in synchronism with the horizontal sync signal BLK, so that a video signal output from the DC level control 232 appears at the output 236 of the switching circuit 210 during a horizontal scan period and the clamp level V1 during a horizontal blanking period. Therefore, the output waveform of the switching circuit 210 is a combination of the two signals as shown in FIG. 3D.

Figure 3D:
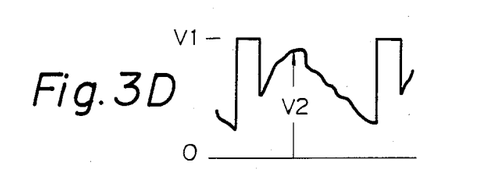
Figure 3E:
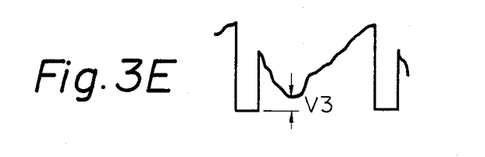

The NP inversion circuit 220 is adapted to shift the level of the signal appearing at the input 236, FIG. 3D, by polarity inversion, the resulting signal, FIG. 3E, appearing at an output 238. In accordance with a characteristic feature of the present invention, the inverted signal is routed to the gamma correction circuit 224 after being subjected to predetermined clamping. In this construction, the darkest areas (peaks) of pictures reproduced by the R, G and B systems are individually detected to develop a composite video signal having an identical white level in dark areas, or the lightest areas (peaks) are individually detected to develop a composite video signal having an identical white balance in light areas.

In accordance with another characteristic feature of the present invention, the inverted signal is routed to the gamma correction circuit 224 via the gain control 222. This not only enhances adequate white balance adjustment in highlight areas for negative films which were obtained under various shooting conditions, but also insures an excellent function of luminance adjustment. That is, the gain control 222 in the illustrated construction serves as a variable gain amplifier whose amplification rate, or gain, is controlled in response to a control input 242, thereby controlling the magnitude of the signal. Preferably, the maximum amplification rate assigned to the gain control 222 is about one and a half to three times the minimum amplification rate. If it is three times, for example, not only the white balance can be adequately corrected within the range of variation of ordinary light such as sunlight or room light, but also negative films resultant from stage lighting or like artificial lighting for any special effect can be reproduced without deterioration. This is derived from the fact that while the sunlight contains the separated color components B, G and R in substantially even proportions, tungsten light includes the proportion of the R light substantially three times as much as the proportion of the B light.

The gain control input 242 to the gain control 222 is applied from an output 240 of the gain control 222 via the clamp circuit 226 and slice and average circuit 228, so that the magnitudes of the color separated signals may be adjusted to correct the white balance of the resulting composite video signal by a procedure which will be described. It is preferable to configurate the system in such a manner that the white balance may be adjustable manually when desired.

The gamma correction circuit 224 functions to compensate the gradation of the film 120 and imaging device 152. The circuit 224 is capable of adjusting $\gamma$ such that the gray scale of a reproduced picture lies on a straight line and, for example, it may select $\gamma$ out of a range of 0.5–2.0 depending upon the kind of the imaging device and by approximation using three broken lines.

The clamp circuit 226 and slice and average circuit 228 constitute in combination a feedback circuit for feeding back the output 240 of the gain control 222 to the control input 242 of the same. The clamp circuit 226 is adapted to clamp the DC level of the output 240 of the gain control 222, i.e., NP inverted signal, FIG. 3E, at a predetermined value (zero volt in the illustrative embodiment, FIG. 3F). The clamped signal, FIG. 3F, is applied to an input 244 of the slice and average circuit 228.

Figure 3F:
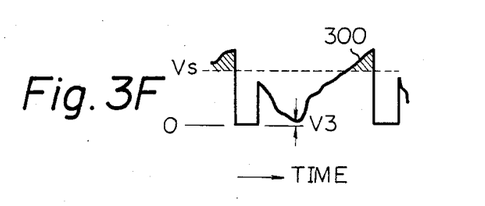
Figure 4:
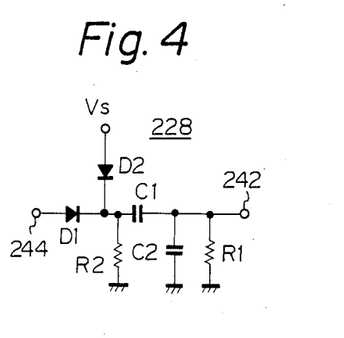
FIG. 4 is a schematic circuit diagram showing an example of a slice and average circuit included in the circuitry of FIG 2.

The slice and average circuit 228 slices the signal with a clamped black level, FIG. 3F, by a given slice level Vs, integrates those portions which are higher than the slice level Vs, i.e., hatched portions 300 in FIG. 3F, and thereby averages the signal over each horizontal scan period. As shown in FIG. 4, the circuit 228 may comprise two diodes D1 and D2 for setting the slice level Vs, a capacitor C1 for cutting off a direct current component, and a capacitor C2 and and a resistor R1 which coact as an integrator. It will thus be seen that the averaging operation is implemented by integration due to charging of the capacitor C2 and averaging due to discharging of the resistor R1. Where the slice level is identical with the clamp level, the system is equivalent to the socalled total integration system in which the maximum value of all the integrated values of a signal is always controlled to predetermined one.

The slice level Vs may be adjusted manually. A preferred range of variation of the slice level Vs is about 50–90%, more preferably about 70%, of a target signal voltage of the output 240 of the gain control 222. The circuit parameters of the integrator, C2 and R1, are predetermined such that the voltage at the output 242 thereof, i.e., voltage associated with an average area of the hatched portions 300, FIG. 3F, is applied to the gain control input 242 of the gain control 222 to adjust the amplification rate, thereby maintaining the average value substantially constant.

Hereinafter will be described in a conceptionlly comparative manner the characteristics of the peak control and slicing and integration system in accordance with the present invention and the total integration system, which may be considered as a special case of the slicing and integration system, in terms of a distribution pattern of one frame of processed output video signals.

Figure 5A:
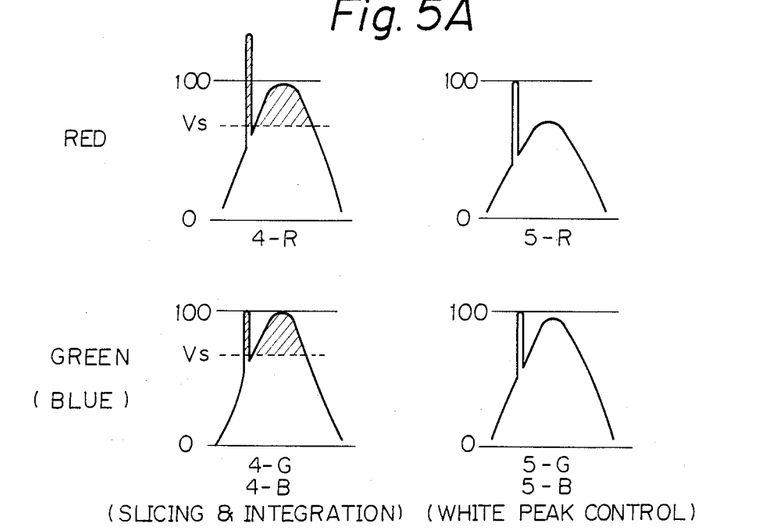
FIGS. 5A, 5B and 6 are diagrams useful for understandting a signal processing function in accordance with the present invention with respect to various patterns.
Figure 5B:
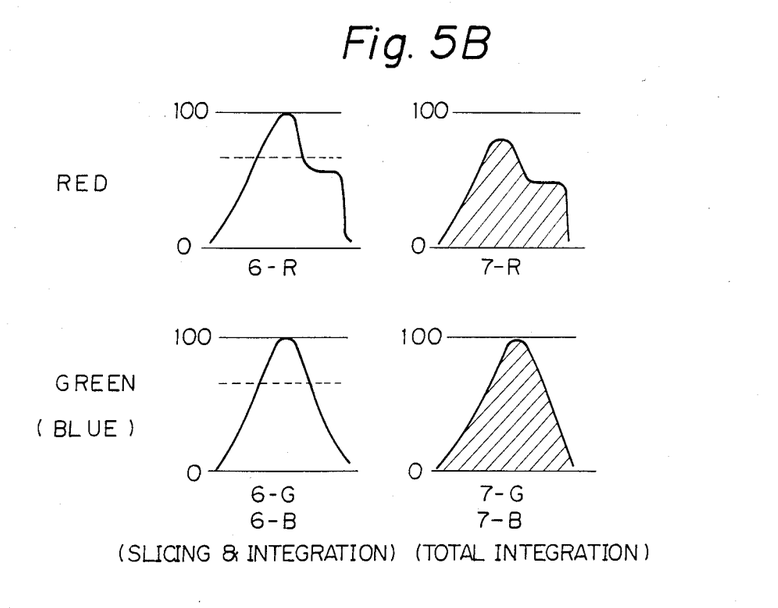

FIGS. 5A and 5B show example in which attention is paid specifically to the color balance adjusting function. FIG. 5A is directed to a picture which includes a red light spot therein. In the figure, the numerals 0 and 100 indicate levels of a relative output picture signal which correspond respectively to the black and white levels of a video signal, while dashed line between the two levels 0 and 100 indicates the slice level Vs. As seen from the figure, in the slice integration system, the respective signals are processed such that the area higher than the slice level of red (hatched portion of 4-R) becomes equal to the area higher than the slice level of green or blue (hatched portion of 4-G or 4-B) maintaining to good color balance between R, G and B. However, in the white peak control system, the peak of an impulse of the red signal is limited to 100 (5-B). On the other hand, the signal peak of the green or blue signal which corresponds to the light spot does not protrude so high beyond the level of the lightest portion of the same image and, therefore, both of them are as high as 100 as shown in 5-G and 5B. As a result, only the red output level is suppressed so that cyan will be accentuated in the color balance of a reproduced image with red appearing dark.

FIG. 5B is direction to another picture in which a red object occupies a substantial area at a medium luminance. No problem arises in this case concerning the slicing and integration system. However, in the case of the total integration system, the red signal is controlled as shown in 7-R to make the area of the hatched portion equal to that of green or blue, again causing red to appear with a lowered level. For the picture shown in FIG. 5B, the peak control system is as effective as the slicing and integration system in adjusting R, G and B, although not shown in the figure.

Figure 6:
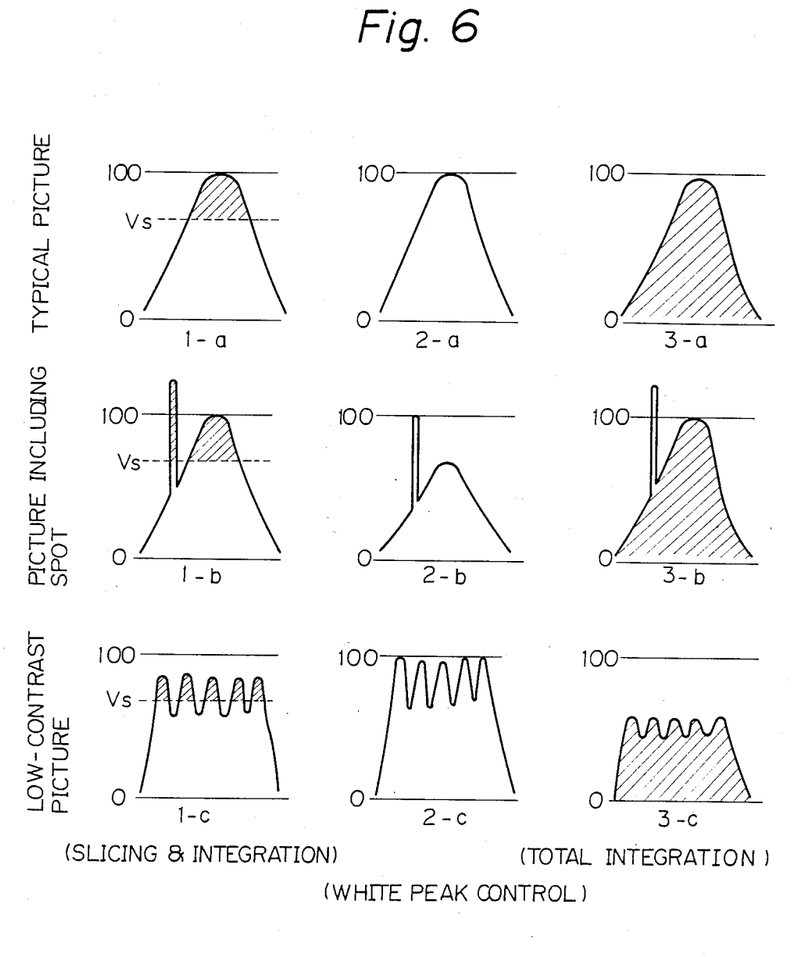

FIG. 6, employing the same view as FIGS. 5A and 5B, shows the slicing and integration system, the white peak control system and the total integration system in a comparative manner with respect to their luminance adjusting function, using an average or standard picture, a picture with a light spot contained therein, and a picture having a low contrast. It will be seen from the figure that for the standard or typical picture the slicing and integration system, white peak control system and total integration system (1-*a*, 2-*a*, and 3-*a*) are substantially equal in output level, that is, hardly any difference exists concerning the system configuration.

As to the picture with a light spot, while the integration system shown in 1-*b* or 3-*b* offers a desirable effect, the white peak control system causes the luminance of the whole picutre, to be lowered as shown in 2-*b*. Further, in the case of the picture which is low in contrast over its entire area, the total integration system lowers the luminance as a wholw as shown in 3-*c*, while the slicing and integration system or the white peak control system does not.

As described above, in the slicing and integration system with which the present invention is concerned, the gain of the gain control 222 is controlled such that the areas of the portions 300 higher than the common slice level Vs (FIG. 3) are controlled substantially to a predetermined value in an averaged sense, FIG. 3F. The integrating and averaging operation is effected for the hatched areas 300 over the entire one field, that is, it is effected for light portions only, whereupon the signal is processed to allow the integrated average value to converge to a predetermined value. This makes it possible to automatically adjust the white balance and luminance in a more stable manner.

The processing circuits 202R, 202G and 202B are assigned respectively to the separated color signals R1, G1 and B1 and constructed to perform the aforementioned signal processing independently of each other. Therefore, a composite video signal with an adequately corrected color balance is produced at the output 252 of the color encoder 250, which is adapted to combine the processor outputs 204R, 204G and 204B. Assuming that the negative film 120 is, for example, a white picture undergone inversion, a compositive video signal with B, G and R components contained in substantially same proportions will appear at the output 252. Further, even when a negative film picture which lacks a purely white or purely black area, white and black levels can be predetermined from the picture information on the negative film.

Various modifications will become possible for those skilled in the art after receiving the teachings of the present disclosure without departing from the scope thereof. For example, while it has been the black level of an inverted signal which is clamped in the illustrative embodiment, the white level, i.e., peak of a non-inverted signal in the negative direction, may be clamped. The present invention is also applicable to the reproduction of a positive image as a positive image, instead of a negative film, in which case clamping the black level is needless.

Furthermore, the present invention finds application not only to still pictures but also to motion pictures. Concerning motion pictures, i.e., a telecine system, it is preferable to employ an integrator in the automatic gain control loop which has a time constant larger than one for the reproduction of still pictures. This is to eliminate an occurrence in a motion picture that, when a partly light object has momentarily moved past the field of a picture being reproduced, the white balance of the whole screen in effected thereby.

In summary, it will be seen that the present invention provides a white balance correction circuit which insures a good color balance regardless of the kind of a light source which existed in a shooting field. That is, the circuit of the present invention is successful to automatically adjust white balance over a wide range of films on which pictures shot under the presence of various light sources may have been recorded.

What is claimed is:

1. A white balance correction circuit for use in a negative-to-positive conversion apparatus, wherein video signals in the form of three separated color components representative of an image recorded on a negative are converted into a color composite video signal representative of a positive image associated therewith, comprising:

three processing means for receiving respective ones of the video signals to process the same; and
encoder means interconnected to said three processing means for combining output signals from said processing means to produce a color composite video signal representative of a positive image associated with the negative image;
each of said processing means including:
inversion means for inverting associated ones of the separated color signals;
maintaining means interconnected to said inversion means for maintaining extreme values of a resultant inverted video signal at a first predetermined level; and
variable gain amplifier means for amplifying an output signal of said inversion means, said variable gain amplifier means varying a gain thereof in response to an integrated average value of portions of the inverted and maintained signal which are higher than a second predetermined level,
whereby said encoder means produces the color composite video signal with its luminance adjusted and white balance corrected.

2. Negative-to-positive conversion apparatus for television signals, wherein an image recorded on a negative is picked up to be converted into a color composite video signal representative of a positive image associated therewith, comprising:

imaging means for picking up an image recorded on a negative to develop video signals representative of the negative image in the form of three color components;
three processing means interconnected to said imaging means for processing respective ones of the three separated color signals; and
encoder means interconnected to said three processing means for combining output signals from said processing means to produce a color composite video signal representative of a positive image associated with the negative image;
each of said processing means including;
inversion means for inverting associated ones of the separated color signals;
maintaining means interconnected to said inversion means for maintaining extreme values of a resultant inverted video signal at a first predetermined level; and
variable gain amplifier means for amplifying an output signal of said inversion means, said variable gain amplifier means varying a gain thereof in response to an integrated average value of portions of the inverted and maintained signal which are higher than a second predetermined level,
whereby said encoder means produces the color composite video signal with its luminance adjusted and white balance corrected.

* * * * *